March 25, 1969 E. ELLNER 3,435,251
CONTROL PANEL

Filed April 21, 1966 Sheet 1 of 3

INVENTOR.
EDWIN ELLNER
BY
Carpenter, Kinney & Coulter
ATTORNEYS

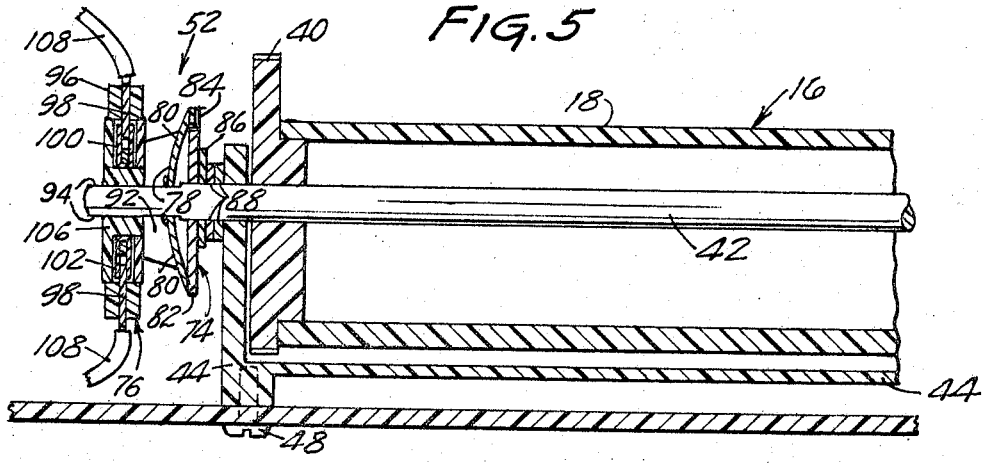
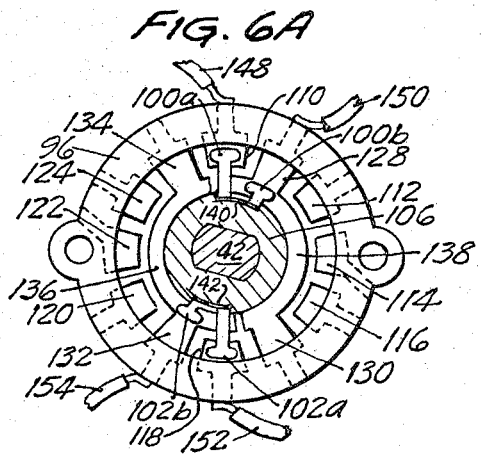
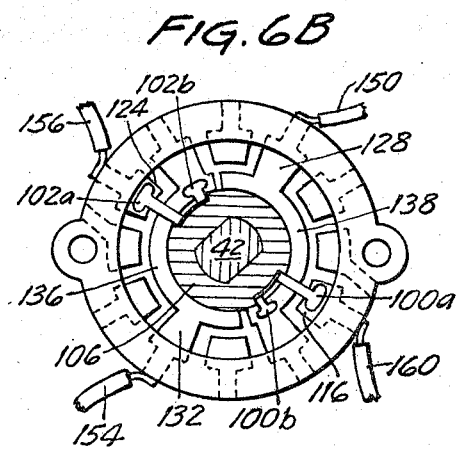
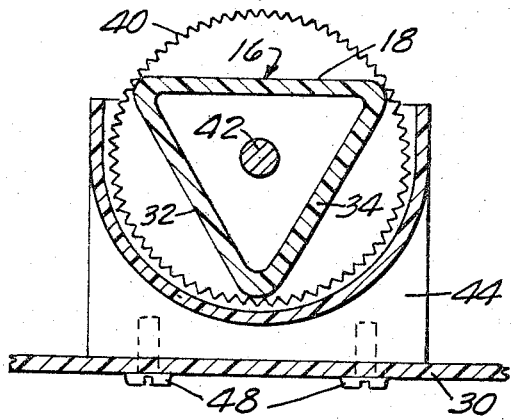
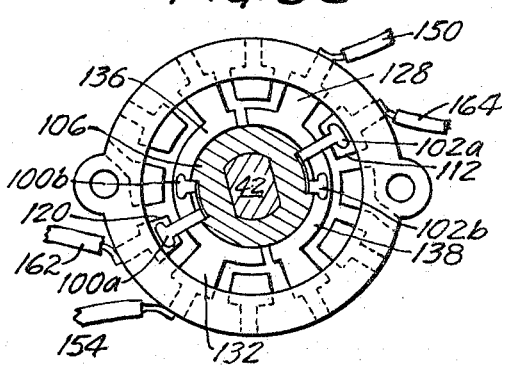

March 25, 1969 E. ELLNER 3,435,251
CONTROL PANEL

Filed April 21, 1966 Sheet 3 of 3

INVENTOR.
EDWIN ELLNER
BY
Carpenter, Kinney & Boulter
ATTORNEYS

United States Patent Office 3,435,251
Patented Mar. 25, 1969

3,435,251
CONTROL PANEL
Edwin Ellner, Oxford, Conn., assignor, by mesne assignments, to Stapling Machines Co., Rockaway, N.J., a corporation of Delaware
Filed Apr. 21, 1966, Ser. No. 544,305
Int. Cl. H02b 1/24
U.S. Cl. 307—115       14 Claims

ABSTRACT OF THE DISCLOSURE

A control panel for operating an electrically controlled device is provided. The panel comprises a plurality of control switches with associated circuitry, a range changing switch with associated circuitry which controls the range of electrical signals provided by actuation of the control switches, a movable scale member having a plurality of groupings of graphical symbols which are positioned adjacent to the control switches such that the symbols indicate the effect of actuating each switch. The scale member is movable between various positions simultaneous with movement of the range changing switch such that the graphical symbols grouping adjacent to the control switches in any position of the scale member corresponds to the range over which the control switches can provide electrical control signals. Independent actuation switches and random switches positioned in parallel with the foregoing described switches and circuitry provide electrical control signals independent of the said foregoing described switches and circuitry.

---

This invention relates to a control panel for controlling an electrically operated device and more particularly to a control panel having a plurality of momentary-contact switches and a rotatable scale member wherein rotation of the scale member from one scale to another changes values associated with each switch and electrical characteristics of an electrical circuit.

Control panels for electrically controlled devices conventionally contain a plurality of switches, each switch having a graphic symbol or numerical value assigned thereto representing a specific function of the device controlled thereby. When a selected one of the switches is actuated, an electrical circuit conditions the electrically controlled device in relation to the graphic symbol or numerical value associated with the actuated switch. One example of such a control panel is a length selection device used for controlling an electrically operated tape dispenser. When a switch on the length selection device is actuated, the tape dispenser is electrically conditioned to dispense a length of tape corresponding to the value designated for the actuated switch.

When a control panel is used to operate an electrically controlled device for feeding sheet or web material, for example a tape dispenser, it is conventional to have each switch represent a different tape length. The number of switches determine the number of different lengths the machine will dispense. Also, because each switch represents an incremental length different than the adjacent switch, the numerical range from the shortest to the longest represented by the switches is dependent on the number of switches and value of each increment. Thus, the physical size of the control panel has been dependent on the number of switches which may in turn depend upon the range desired and increments desired within the range.

A control panel constructed in accordance with the present invention affords a control panel of a convenient usable size and one with considerable versatility.

A control panel according to the present invention affords, with a predetermined number of switch buttons arranged in a predetermined array and a movable scale associated with the buttons, a device wherein the range, the increments within the range and the increment between the ranges may be variables. Thus, the device of the present invention overcomes the disadvantages associated with present electrical control units.

The device of the present invention comprises a panel having a plurality of switches arranged in a predetermined array, first circuit means associated with said switches affording a different predetermined electrical signal upon closing a different one of said switches, a scale member having various positions and bearing graphic symbols thereon and positioned adjacent said switches to associate different graphic symbols or values with each said switch (preferably being a numerical value) in each of said positions, and second circuit means associated with and responsive to movement of said scale member to said various positions to vary the electrical signal associated with each said switch.

Another feature of the present invention is that the control panel switches are capable of representing any one of several numerical values, which values are displayed on an adjacent aligned movable scale member. The number of numerical values each switch can represent is determined by the number of groups of numerical values displayed on the scale member.

Yet another feature of the present invention is that the range of numerical values and the numerical values associated with each switch within each range are quickly and easily changed by selectively moving the scale member.

The control panel electrically operates an electrically controlled device. In this embodiment, the panel has a plurality of momentary-contact switches, each switch being aligned in a column. A movable scale member is positioned in adjacent alignment with the column of momentary-contact switches. The movable scale member has a plurality of graphic symbols thereon. The symbols are arranged in selectable groupings each containing a graphic symbol capable of being assigned to each momentary-contact switch when any one of the groupings is selectively in adjacent alignment with the column of momentary-contact switches. A plurality of selection resistors are operatively connected to the momentary-contact switches. The selection resistors are connected in a series circuit relation with each other providing two end terminals. Additionally, the resistors are connected in parallel circuit relationship with the momentary-contact switches such that a portion of the selection resistors is selectively bypassed when any one of the momentary-contact switches is selectively actuated. A multicontact switch having a plurality of fixed contacts and a first and second wiper is fixedly connected to move with the movable scale member. Each of the fixed contacts is operatively connected to an associated range-adjusting resistor to connect it in series with the selection resistors. The first and second wiper members are electrically connected to different end terminals of the selection resistors.

These and other further features and advantages of the control panel of the present invention will be more fully understood from the following detailed description which refers to the accompanying drawing wherein:

FIGURE 3 is an end sectional view illustrating a transverse section of the rotatable scale member;

FIGURE 5 is a fragmentary sectional view taken along the line 5—5 of FIGURE 2 illustrating a multicontact switch cooperating with the scale member;

FIGURES 6A through 6C are transverse sectional views of the multicontact switch illustrating the various positions of the movable scale member;

Figure 1:
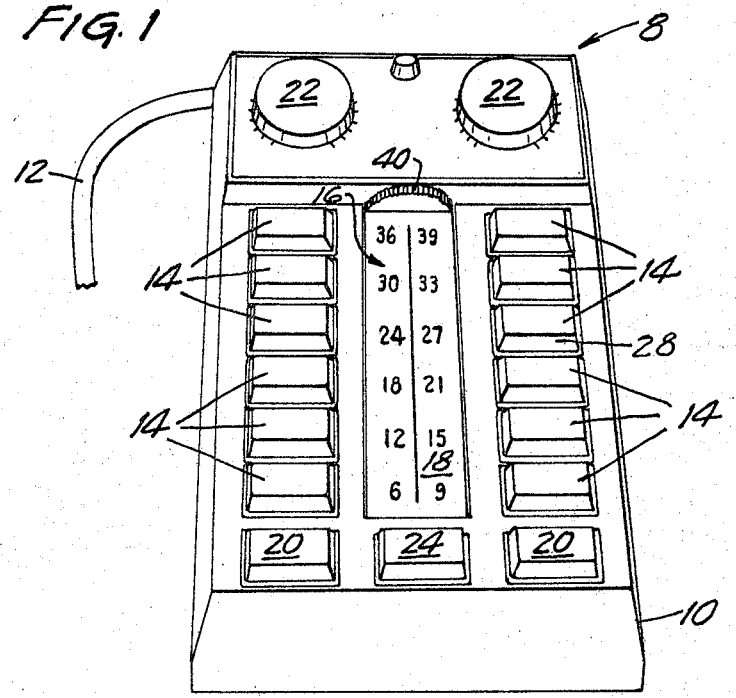
FIGURE 1 is an isometric view of a control panel utilizing the present invention.

Referring now to the drawing, the control panel, generally designated 8, is adapted to be connected to an electrically controlled device via a cable 12. The control panel 8 has a housing or cover 10 with a plurality of momentary-contact switches 14, 20 and 24 positioned thereon, an index or scale member 16 and selector knobs 22. The switches 14 are aligned in spaced parallel columns. Each momentary-contact switch 14 has a graphic symbol assigned thereto, which symbols are displayed on the rotatable scale member 16. The scale member 16 has a plurality of surface areas adapted to be positioned in registry with an opening in a cover 10 of the panel 8. Graphic symbols or indicia are arranged in selectable groupings on the surfaces of the scale member 16; a typical 6 through 39 grouping of numerical values are arranged on a surface 18 of the scale member as shown in FIGURE 1. When the scale member 16 is in the illustrated position, each momentary-contact switch 14 has a numerical value associated therewith within the selected range. When any one of the momentary-contact switches 14 is selectively actuated, an electrical signal, representative of the numerical value assigned to the actuated switch 14, operates the electrically controlled device via cable 12.

The momentary-contact switches 20 are associated with circuits controlled by the variable value selector knobs 22. Each variable value selector knob 22 is selectively adjusted or rotated relative to a dial bearing indicia to assign a given numerical value to its associated momentary-contact switch 20. When the associated momentary-contact switch 20 is actuated, an electrical signal, representative of the numerical value selectively adjusted by the selector knob 22, operates the electrically controlled device via cable 12. Thus, for example, when a given length of tape is going to be repeated over and over, one of the knobs 22 may be set at said given length and the length will be given repeatedly by pressing its associated switch 20.

The switch 24 operates through a circuit independent of either switches 14 or 20 to control the electrically controlled device and, as long as the switch 24 is actuated, a signal is delivered to the device for operating the same.

The cover 10 has a plurality of apertures, some of which are arranged in rows, each aperture receiving a momentary-contact switch therein. The cover 10 also provides supports for resilient finger tip covers 28. Each cover 28 is yieldably supported over and covers each of the momentary-contact switches 14, 20 and 24. The rotatable scale member 16 is positioned in an elongated opening, which opening is between and parallel to the apertures in which switches 14 are positioned. When a grouping of numerical values are in assigning position, the numerical values are visible through the elongated opening and are in adjacent alignment with the momentary-contact switches 14.

Figure 2:
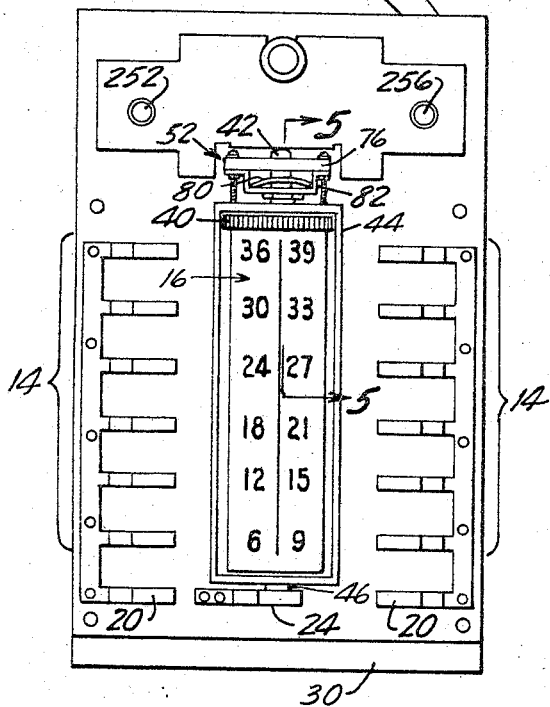
FIGURE 2 is a top view illustrating switches and a rotatable scale member of the control panel.

FIGURE 2 illustrates the control panel 8 with cover 10 removed exposing the scale member 16, the momentary-contact switches 14, 20 and 24. The momentary-contact switches 14, 20 and 24 and the scale member 16 are supported on an insulating base 30, which base is also an electrical printed circuit board.

A transverse section of the rotatable scale member 16 is illustrated in FIGURE 3. In this embodiment, the scale member 16 is triangular shaped, having three separate surfaces 18, 32 and 34, each containing a set of numerical values or other graphic symbols to be associated with the switches 14. As noted, the set of numerical values on surface 18 indicate a numerical range from 6 through 39. A second set of numerical values on surface 32 could range from 15 through 48 and a third set of numerical values on surface 34 could range from 36 through 69 in this embodiment. Thus, the scale member 16 can be selectively rotated to place either of the surfaces 18, 32 or 34 in a range assigning position.

Referring again to FIGURE 2, the rotatable scale member 16 has a disk or annular member 40 connected thereto and is supported by a shaft 42. A scale support member 44 journals the shaft 42 at one end in a bushing 46 and journals the other end of the shaft in the opposite end of the support member 44. The support member 44 is fixedly connected to the insulating base 30 by means of fastening members, such as screws 48 illustrated in FIGURE 3. The rim of the annular member 40 is knurled to facilitate easy rotation of the scale member by an operator's finger. The structural relationship between the annular member 40, shaft 42 and support member 44 are also illustrated in FIGURE 3.

In FIGURE 2, a multicontact switch generally indicated at 52, located on the opposite end of support member 44, is positioned in axial alignment with the scale member 16. Movable wiper members 100 and 102 within the multicontact switch 52 are fixedly connected to rotate with shaft 42. This is shown clearly in the vertical sectional view of the multicontact switch 52 illustrated in FIGURE 5.

Figure 4:
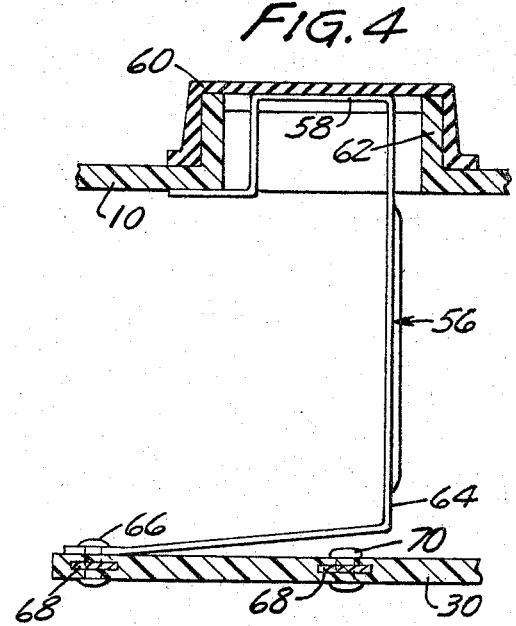
FIGURE 4 is a vertical sectional view illustrating a switch structure.

FIGURE 4 is a vertical sectional view of any one of the momentary-contact switches 14, 20 and 24. The momentary-contact switch, designated as 56, is supported by the insulating base 30 within the removable cover 10. The momentary-contact switch 56 is constructed of a spring-like material, for example stainless steel, and has an upper pressure-responsive portion 58 which moves the entire switch 56 downward in response to finger tip pressure applied thereto by an operator's finger through an associated resilient finger tip cover 60. Cover 60 is removably connected on a support 62 over an aperture located in the removable cover 10. Momentary-contact switch 56 has a lower portion 64 which is pivotally mounted on the insulating base 30 via a fastener 66. Fastener 66 serves as a mechanical support for momentary-contact switch 56 and concurrently provides an electrical connection between the switch 56 and an electrical printed circuit, shown generally as 68, embedded within the insulating base 30. A terminal 70, spaced from fastener 66, is positioned to be contacted by the lower portion 64 when switch 56 moves downward in response to a finger pressure being applied to the upper portion 58. Terminal 70 is electrically connected to the electrical printed circuit 68 embedded within the insulating base 30.

When momentary-contact switch 56 is actuated, the lower portion 64 engages terminal 70 completing an electrical circuit from a portion of printed circuit 68, through fastener 66, the lower portion 64 of switch 56, terminal 70 to another portion of the printed circuit 68.

Referring now to FIGURE 5, the structural relationship between the movable scale member 16 and the multicontact switch 52 is illustrated. Shaft 42 extends through one end of the scale support member 44 to operatively engage multicontact switch 52. The multicontact switch 52 comprises two sections, a position locking section 74 and an electrical switching section 76. The position locking section 74 includes a spring disk 78 rigidly connected to shaft 42. Spring disk 78 has two bowed sector portions 80 which slideably engage a fixed locking member 82 supported in position by being secured to the support member 44. Locking member 82 has a plurality of circumferentially spaced depressed areas 84 which are capable of receiving the sector portions 80 to register and retain the scale member in the various range assigning positions. Shaft 42 and spring disk 78 are moved in conjunction with the scale member 16 when the member 16 is selectably rotated via annular member 40 to position a different grouping of graphic symbols in range assigning position. The bowed sector portions 80 of spring disk 78 engage the depressed areas 84 to lock the scale member 16 in the selected position. A nut 86 and spacers 88 hold the locking member 82 in a fixed spaced relationship from support member 44. The locking member 82 has a projecting member 92 which rigidly connects the locking member 82 to the electrical switching section 76.

The portion of shaft 42 which engages the electrical switching section 76 of multicontact switch 52 has two notches 94, one notch on each side of shaft 42. The electrical switching section 76 comprises an annular insulating support 96 which houses a plurality of fixed contacts, illustrated generally as 98, a first wiper member 100 and a second wiper member 102. Each wiper member 100 and 102 is secured to a movable insulated hub 106, which hub is affixed to the notched portions 94 of shaft 42. Conductors, shown generally as 108, are electrically connected through the insulating support 96 to the fixed contacts 98.

Wiper members 100 and 102 each engage one of the fixed contacts 98 to complete an electrical circuit through conductors 108. The multicontact switch 52 selectively switches predetermined circuit components into and out of the circuit through conductors 108 simultaneous with the particular grouping of graphic symbols placed in range assigning position.

FIGURE 6 illustrates the structural details of the multicontact switch 52 for the various range assigning positions of the rotatable scale member 16. Specifically, FIGURES 6A, 6B and 6C illustrate the structural relationship between the fixed contacts 98 and the wiper members 100 and 102 for each of the three range assigning positions discussed hereinbefore in FIGURE 3.

Referring now to FIGURE 6A, the fixed contacts of multicontact switch 52 include eight different fixed contacts 110 through 124 and four common fixed contacts 128 through 134. Common fixed contacts 128 and 130 are connected to a split commutator ring 138 and common fixed contacts 132 and 134 are connected to a split commutator ring 136. Each of the commutator rings 136 and 138 are shaped in 180° sectors with the ends thereof spaced from each other. The spacings between each of the commutator rings 136 and 138 are radially aligned with each other and with the ends of the different fixed contacts 110 and 118. The first and second wiper members 100 and 102 are each supported in notched portions 140 and 142, respectively, of the insulated hub 106. The notched portions 140 and 142 are radially aligned with each other. First wiper member 100 includes a large slideable contact 100a which is capable of separately slideably engaging any one of the different fixed contacts 110 through 124. A small commutator contact 100b, electrically connected to slideable contact 100a, continually contacts either one of the split commutator rings 136 or 138. Similarly, the second wiper member 102 includes a large slideable contact 102a which is capable of separately slideably engaging any one of the different fixed contacts 110 through 124 provided, however, that slideable contact 102a is in generally opposed radial alignment with slideable contact 100a of the first wiper member 100. A small commutator contact 102b, electrically connected to slideable contact 102a continually contacts either one of the split commutator rings 136 or 138 depending on the position of contact 102a.

FIGURE 6A is a diagrammatic representation of the multicontact switch 52 when the scale member 16 has surface 18 in range assigning position. The slideable contact 100a engages fixed contact 110 while the commutator contact 100b slideably engages split commutator ring 138. A conductor 148 is electrically connected to different fixed contact 110 and another conductor 150 is electrically connected to common fixed contact 128. An electrical circuit is completed from conductor 148 through fixed contact 110, contact 100a, contact 100b, split commutator ring 138, fixed contact 128 to second conductor 150.

Concurrently, slideable contact 102a engages fixed contact 118 while the commutator contact 102b slideably engages split commutator ring 136. A conductor 152 is electrically connected to fixed contact 118 and another conductor 154 is electrically connected to fixed contact 132. A second electrical circuit is completed from conductor 152 through fixed contact 118, contact 102a, contact 102b, split commutator ring 136, fixed contact 132 to conductor 154.

FIGURE 6B illustrates the positions of the wiper members 100 and 102 when the scale member 16 has surface 32 in range assigning position. In this position, the slideable contact 102a engages fixed contact 124 while commutator contact 102b slideably engages split commutator ring 136. A conductor 156 is electrically connected to fixed contact 124. Thus, an electrical circuit is completed from conductor 156, through fixed contact 124, contact 102a, contact 102b, split commutator ring 136, fixed contact 132 to conductor 154. Concurrently, slideable contact 100a engages fixed contact 116 while commutator contact 100b slideably engages split commutator ring 138. A conductor 160 is electrically connected to fixed contact 116. Thus, a second electrical circuit is completed from conductor 160 through fixed contact 116, contact 100a, contact 100b, split commutator ring 138, fixed contact 128 to conductor 150.

FIGURE 6C is a diagrammatic representation of the wiper members 100 and 102 when the rotatable scale member 16 has surface 34 in range assigning position. Slideable contact 100a engages fixed contact 120, which contact has a conductor 162 electrically connected thereto. An electrical circuit is completed from conductor 162 through fixed contact 120, contact 100a, contact 100b, split commutator ring 136, fixed contact 132 to conductor 154. Concurrently, slideable contact 102a engages different fixed contact 112, which contact has a conductor 164 electrically connected thereto. A second electrical circuit is completed from conductor 164 through fixed contact 112, contact 102a, contact 102b, split commutator ring 138, fixed contact 128 to conductor 150.

When rotatable scale member 16 is again selectively rotated to place surface 18 in range assigning position, the first and second wiper members 100 and 102 again are arranged in the positions depicted in FIGURE 6A. Each range assigning position of the rotatable scale member 16 causes the first and second wiper members 100 and 102 to engage at least one fixed contact corresponding to the range assigning position of the scale member 16.

Figure 7:
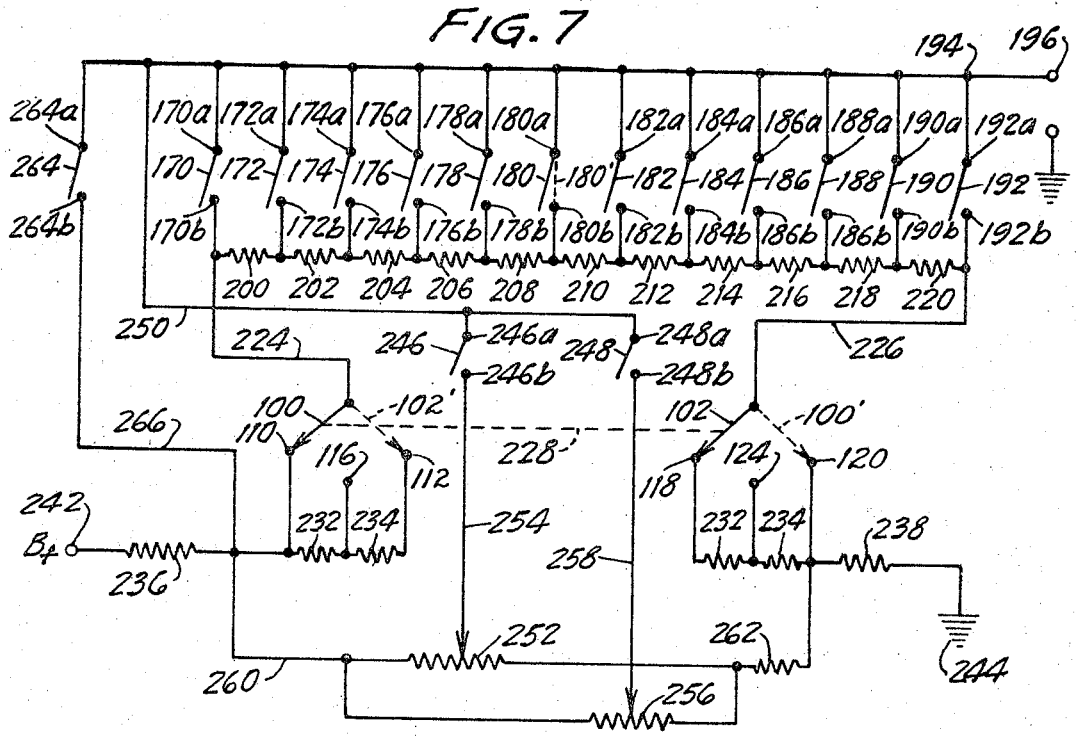
FIGURE 7 is a schematic diagram illustrating the electrical circuitry of the control panel.

In the schematic diagram of FIGURE 7, the various momentary-contact switches 14, 20 and 24 and the multicontact switch 52 are illustrated by equivalent electrical symbols representative of normally open switches and separate multicontact switches, respectively.

The momentary-contact switches 14, which are aligned in columns as illustrated in FIGURE 2 are represented by normally open switches 170 through 192. Each switch has a first and second terminal identified as a and b terminals of the respective contacts. For example, switch 170 has a first terminal 170a and a second terminal 170b. Similarly, all of the other switches have a and b terminals ending with terminals 192a and 192b. The first terminals 170a through 192a are electrically connected together by means of a common bus 194. Common bus 194 is connected to an output terminal 196, which terminal ultimately applies the produced electrical signals to an electrically controlled device (not shown).

First circuit means comprising a plurality of first electrical elements or selection resistors, designated as 200 through 220, each having end terminals are connected in a series circuit relationship with each other providing connecting terminals. The connecting terminals are electrically connected to the second terminals 170b and 192b of the end switches 170 and 192, respectively. Additionally, each selection resistor has each end terminal thereof connected to a different second terminal of one momentary-contact switch. For example, one end terminal of selection resistor 200 which concurrently is a connecting terminal of the series connected selection resistors is connected to second terminal 170b. The other end terminal of selection resistor 200 and one end terminal of selection resistor 202 are both operatively coupled to second terminal 172b of momentary-contact switch 172. Each of the remaining end terminals of selection resistors 202 through 220 would be similarly connected with the second terminals of the other switches 172 through 192.

When all of the switches 170 through 192 are in open position, all of the selection resistors 200 through 220 are electrically connected in a series circuit relationship. The selection resistors 200 through 220 in combination with second circuit means comprising multicontact switch 52 and range-adjusting resistors 232 and 234 provide a network having a constant resistance. When any one of the switches 170 through 192 is actuated, a predetermined electrical signal is applied to common bus 194, which signal is a function of the number of selection resistors between the second terminal of the actuated switch and the selectable switching connections of the range-adjusting resistors within the constant resistance network.

The electrical connection between the selection resistors 200 through 220 and the multicontact switch 52 will now be considered and the reference numbers associated with multicontact switch 52 have been retained. The end terminal of selection resistor 200 is electrically connected to the second terminal 170b of momentary-contact switch 170 and, via a conductor 224, to split commutator ring 138 of the multicontact switch 52 which contacts either one of the wiper members 100 and 102. Similarly, the end terminal of selection resistor 220 is electrically connected to the second terminal 192b of momentary-contact switch 192 and, via a conductor 226, through split commutator rings 136 to the other of the wiper members 100 and 102.

The first wiper member 100 and the second wiper member 102 are gang operated, as illustrated by dashed line 228, and are fixedly connected to move when the scale member 16 is selectively rotated through different range assigning position. First wiper member 100 is capable of slideably engaging split commutator ring 138 with fixed contact 110 or 116 and split commutator ring 136 with fixed contact 120. Second wiper member 102 is capable of slideably engaging split commutator ring 136 with fixed contact 118 or 124 and split commutator ring 138 with fixed contact 112. When the first wiper member 100 slideably engages contact 110, the second wiper member 102 slideably engages contact 118. A similar relationship exists for each of the other two sets of contacts.

Second electrical elements or range-adjusting resistors 232 are electrically connected between each of the fixed contacts 110 and 116 and fixed contacts 118 and 124. Additional range-adjusting resistors 234 are electrically connected between fixed contacts 116 and 112 and fixed contacts 124 and 120, respectively. Voltage dividing resistors 236 and 238, which determine the operating level of the control panel circuitry, each have one end thereof connected to fixed contact 110 and fixed contact 120, respectively. The other end of voltage dividing resistor 236 is connected to a termnial means adapted for connecting the control panel circuitry to a source of potential, or B+ potential, indicated as a terminal 242. The other end of voltage dividing resistor 238 is electrically connected to a grounding terminal 244.

When the first and second wiper members 100 and 102 slideably engage fixed contacts, for example fixed contacts 110 and 118 respectively, an electrical circuit is completed from the B+ terminal 242 through voltage dividing resistor 236, fixed contact 110, first wiper member 100, conductor 224, the series connected selection resistors 200 through 220, conductor 226, second wiper member 102, fixed contact 118, range-adjusting resistors 232 and 234, voltage dividing resistor 238 to the grounding terminal 244. Since all of the switches 170 through 192 are in open position, output terminal 196 will not have an electrical signal applied thereto.

When any one of the switches 170 through 192 is actuated, a predetermined electrical signal is applied to output terminal 196. For example, when switch 180 is selectively actuated as illustrated by the dashed line 180', the switch 180 connects first terminal 180a to the second terminal 180b. When this occurs, the voltage impressed upon the second terminal 180b by the series connected selection resistors is applied to the common bus 194 and subsequently to output terminal 196. In this example, the voltage is determined by the voltage drop across selection resistors 210 through 220, range-adjusting resistors 232 and 234 and voltage dividing resistor 238.

The range-adjusting resistors 232 and 234 are switched from connection between selection resistor 220 and voltage dividing resistor 238 into connection between voltage dividing resistor 236 and selection resistor 200. The switching of the range-adjusting resistors is accomplished by wiper members 100 and 102 engaging each of their respective fixed contacts as the scale member 16 is moved to position different graphic symbol groupings adjacent the switches 170 through 192.

As range-adjusting resistors 232 and 234 are switched within the circuit, the magnitude of the electrical signal produced at the output terminal 196 is proportional to whether none, one or both of the range-adjusting resistors are connected between selection resistor 220 and voltage dividing resistor 238. For example, the first wiper member 100 and the second wiper member 102 can be moved to slideably engage fixed contacts 120 and 112, respectively, which position is illustrated by the dashed lines 100' and 102'. All switches 170 through 192, when actuated, produce a different output voltage on output terminal 196 since the range-adjusting resistors 232 and 234 are no longer connected in the circuit between selection resistor 220 and voltage dividing resistor 238. Thus, by switching the range-adjusting resistors 232 and 234 as described, the predetermined electrical signal associated with each switch can be varied in a predetermined manner as the scale member 16 is placed in each graphic symbol grouping assigning position while maintaining the constant resistance of the network including the selection resistors and range-adjusting resistors.

With switches 170 through 192 in open position, a change of range is accomplished due to movement of first and second wiper members 100 and 102 such that the range-adjusting resistors 232 and 234 are selectively switched within the constant resistance network including the selection resistors and the range adjusting resistors.

The momentary-contact switches 20 are represented by switches 246 and 248. Switch 246 has first and second terminals 246a and 246b, respectively, and switch 248 has first and second terminals 248a and 248b, respectively. The terminals 246a and 248a are electrically connected by a conductor 250 to the common bus 194. Switch 246 has its second terminal 246b electrically connected via a conductor 254 to a movable tap of potentiometer 252. Switch 248 has its second terminal 248b electrically connected via a conductor 258 to a movable tap on a potentiometer 256. Potentiometers 252 and 256 are electrically connected in parallel to each other and are representative of the variable value selector knobs 22. Each of the potentiometers 252 and 256 are connected via a conductor 260 to one end of voltage dividing resistor 236. Also potentiometers 252 and 256 are connected via a resistor 262 to one end of the other voltage dividing resistor 238.

In this arrangement, the circuit comprising the B+ supply terminal 242, voltage dividing resistor 236, conductor 260, parallel connected potentiometers 252 and 256, resistor 262, voltage dividing resistor 238, which resistor 238 is connected to grounding terminal 244, is continually energized. Thus, a network including potentiometers 252 and 256 and resistor 262 is connected in parallel to the network including selection resistors 200 through 220 and range-adjusting resistors 232 and 234. In this manner, the operation of the variable value selector knobs 22 are independent of the range-adjusting feature related to the switches 14.

To select a variable value, using for example switch 246, potentiometer 252 is adjusted to the desired setting. Thereafter, switch 246 is actuated and the voltage corresponding to the setting of the movable tap on the potentiometer resistor 252 is applied to the common bus 194 and subsequently to output terminal 196. The electrical signal produced when switch 246 is actuated is independent of the multicontact switch 52 setting for the network including selection resistors 200 through 220 and range-adjusting resistors 232 and 234.

A similar operation is completed by use of switch 248 and potentiometer 256. The operation of each switch 246 and 248 is independent of the other and each are independent of the switches 170 through 192.

The random switch 24 is represented by switch 264 having a first terminal 264a and a second terminal 264b. First terminal 264a is electrically connected to common bus 194. Second terminal 264b is electrically connected via a conductor 266 to one end of the voltage dividing resistor 236. Thus, the random switch 24 is connected in parallel to both the network including selection resistors 200 through 220 and range-adjusting resistors 232 and 234 and the network including potentiometers 252 and 256. When switch 264 is actuated, the voltage across voltage dividing resistor 236 is applied to common bus 194 and subsequently to output terminal 196. The electrical signal produced when switch 264 is actuated is independent of the selection resistors 200 through 220, the range-adjusting resistors 232 and 234 and potentiometers 252 and 256.

The following typical values were employed in a preferred embodiment

| Component: | Value |
| --- | --- |
| Resistors 200 through 220 | 100Ω |
| Resistor 232 | 300Ω |
| Resistor 234 | 700Ω |
| Resistor 236 | 1KΩ |
| Resistor 238 | 390Ω |
| Potentiometers 252 and 256 | 5KΩ |
| Resistor 262 | 270Ω |
| B+ potential source, volts D.C. | 50 |

In this embodiment, the switches 14 as illustrated in FIGURES 1 and 2 have a range of values from 6 through 39, each value having an increment of 3 therebetween. The lowest value 6 is located in the lower left hand corner and is assigned to the momentary-contact switch 14 immediately adjacent to the 6 eappearing on the scale member 16. The next highest value 9 appears in an adjacent column to the value 6 and is assigned to momentary-contact switch 14 immediately adjacent to the 9 appearing on the scale member 16. The next highest value 12 is located in the same column as the 6 but in a next higher row. Similarly, the momentary-contact switch 14 adjacent the 12 is assigned the value 12. The same sequence is followed up to the highest value 39 which is located on the upper right hand corner of the scale member 16.

The momentary-contact switch associated with value 6 is switch 170 of FIGURE 7 while the value 9 is associated with switch 172 of FIGURE 7. Switch 174 of FIGURE 7 corresponds to the momentary-contact switch 14 adjacent value 12 in FIGURE 1. A similar relationship exists for each of the remaining values up to value 39, which value is associated with switch 192 of FIGURE 7. Thus, the schematic diagram of FIGURE 7 illustrates the switches in alignment while physically the momentary-contact switches 14 are staggered in the embodiment of FIGURE 1. It is understood that a different arrangement of the switches could be employed in FIGURE 1, for example, each column of values would increase only by the increments therebetween rather than twice the increments as illustrated in FIGURE 1.

In the schematic diagram of FIGURE 7 the range-adjusting resistors 232 are each 300 ohms. Thus, when the scale member 16 is rotated placing surface 32 in range assigning position, the scale member 16 will have the value 15 appearing in the lower left hand corner of the scale member 16. Each of the remaining values would increase by increments of 3 in the same relationship as illustrated in FIGURE 1 to the maximum value 48 which would appear in the upper right hand corner of scale member 16.

The second range-adjusting resistors 234 are each 700 ohms such that when the scale member 16 is rotated placing surface 34 in range assigning position, the value 36 will appear in the lowermost left hand corner of the scale member 16 and the highest value appearing at the uppermost right hand corner would be 69. Thus, the selection of range-adjusting resistors 232 and 234 are such that the ranges are staggered, that is, do not have even increments therebetween.

If it is desirous to stack rather than stagger the 3 ranges such that there is no overlapping of values, range-adjusting resistors 232 and 234 could each be 1200 ohms. The resulting increase in the total resistance of the voltage divider network, and the resulting decrease in the increments of voltage change effected by actuation of the switches 170 through 192, should be compensated, for example by proportionately increasing the B+ supply voltage and the firing voltage of the control circuit. With such a relationship, surface 18 of scale member 16 would have a range of 6 through 39, surface 32 would have a range from 42 through 75 and surface 34 would have a range of 78 through 111.

It is also understood that smaller increments between values on the scale member 16 could be employed. For example, the resistors 200 through 220, which are each 100 ohms in FIGURE 7, could be replaced with resistors each having a value of 50 ohms representing increments of 1½. If such an increment between values is selected and it is desirous to stack the ranges, each of the range-adjusting resistors 232 and 234 would be 600 ohms. The resulting increase in the total resistance of the voltage divider network should be compensated, for example in the manner previously described. In such an embodiment, surface 18 would have a range from 6 through 22½, surface 32 would have a range from 24 through 40½ and surface 34 would have a range from 42 through 58½.

If it is desirous to have a starting value which is less than the value 6, it is understood that one could select resistor 236 to be of a value less than 1000 ohms. For example, if it was desirous to have the lowest value be 3 with the 1½ increments therebetween, resistor 236 would be 900 ohms while resistor 238 would be increased to 490 ohms. Again, the resulting change in total resistance should be compensated, for example as suggested above.

Figure 8:
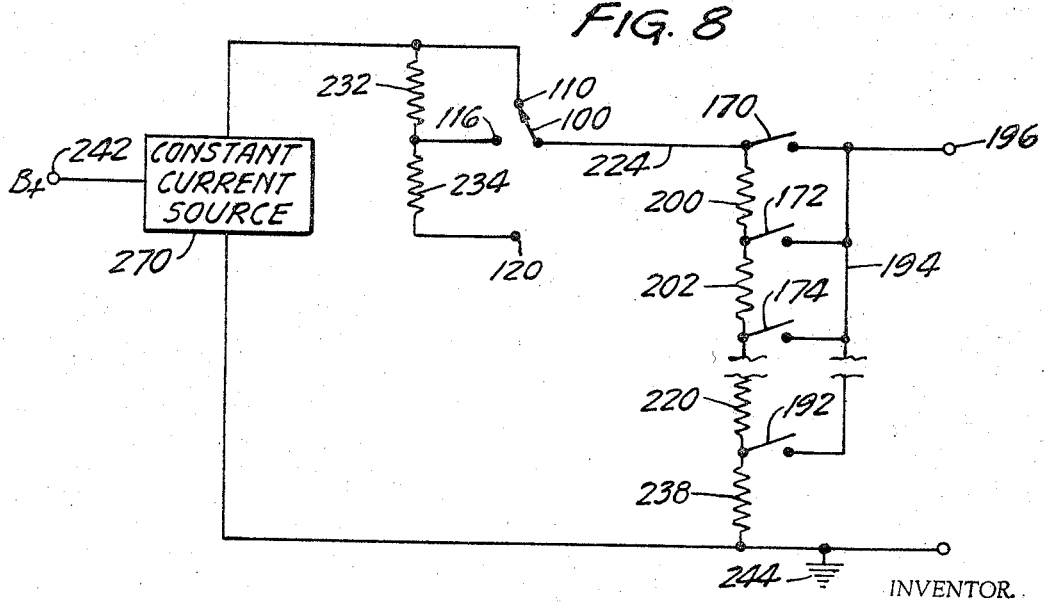
FIGURE 8 is a schematic diagram illustrating another embodiment of the control panel utilizing a constant current generator.

FIGURE 8 illustrates a second species utilizing a constant current generator 270, which source may comprise any one of many known constant current generators. The constant current generator 270 is energized from the B+ source of potential 242 and produces a constant current output regardless of loading across output terminal 196 and grounding terminal 244. In this embodiment, the multicontact switch 52 needs only a single wiper member, for example 100, and three different fixed contacts, for example 110, 116 and 120. The range-adjusting resistor 232 would be connected between fixed contacts 110 and 116 while range-adjusting resistor 234 would be connected between fixed contacts 116 and 120. In this embodiment, fixed contact 110 would be connected to the constant current generator 270 such that when wiper member 100 engages fixed contact 110 no current will be conducted through either of the range-adjusting resistors 232 and 234. However, when wiper member 100 engages either fixed contact 116 or 120, current will flow through either resistor 232 or resistor 232 connected in series with resistor 234, respectively. The constant current through the range-adjusting resistor provides a predetermined voltage drop depending on the range position of the scale member 16.

The wiper member 100 is connected by conductor 224 to the series connected selection resistors 200 through 220, which selection resistors are connected to switches 170 through 192 in an arrangement similar to that as described in FIGURE 7. Switch 192 would be connected through resistor 238 to grounding terminal 244. The constant current from generator 270 would cause a predetermined voltage drop across the selection resistors such that actuation of any one of the switches would apply a predetermined voltage to the bus 194 and subsequently across output terminal 196 and grounding terminal 244.

In this arrangement, the switching of the range-adjusting resistors 232 and 234 in series with selection resistors 200 through 220 constitutes a variable resistance network. The constant current generator 270 provides a fixed current under all various resistance conditions associated with the variable resistance network. This alternative embodiment produces a predetermined signal, when any one of the switches 170 through 192 are actuated, which is representative of the value assigned to the actuated switch.

It is appreciated that by selectively choosing appropriate resistors, the increments between values, the overall range and the increments between ranges can be selectively varied.

Having thus described the control panel of this invention, it is to be understood that various modifications will be apparent to one having ordinary skill in the art and all such changes are contemplated as may come within the scope of the appended claims and any equivalents thereof.

What is claimed is:
1. A control panel for operating an electrically controlled device, said panel comprising
   (a) a plurality of control switches arranged in a predetermined array;
   (b) first circuit means associated with said switches affording a different predetermined electrical signal upon actuation of any one of said control switches;
   (c) a movable scale member supported for movement between a predetermined number of positions and bearing a predetermined number of selectable groupings of graphic symbols, each group of which may be separately positioned on said panel in association with said control switches for assigning a graphical symbol to each of said control switches which indicates the electrical signal afforded upon actuation of each of said control switches; and
   (d) second circuit means operatively connected to said movable member and to said first circuit means for varying the predetermined electrical signal associated with each switch in a predetermined manner upon movement of said member to position a different grouping of graphic symbols adjacent said control switches.

2. The control panel of claim 1 wherein said control switches are momentary-contact switches, said first circuit means is a constant resistance network and said second circuit means includes selecting means fixedly connected to move with said scale member and electrically connected to said first circuit means for varying the predetermined electrical signal produced from said first circuit means in response to actuation of any one of said switches while maintaining the constant resistance of said first circuit means.

3. The control panel of claim 2 wherein said selecting means is a multicontact switch having wiper members, said wiper members each having first and second contacts, said first contacts being electrically connected to said first circuit means and said second contacts being capable of being switched between various positions of said second circuit means.

4. The control panel of claim 1 further comprising
   (e) a removable cover, said cover having a plurality of apertures arranged in at least one column and positioned to receive one of the control switches in each said aperture, said cover having an elongated opening extending parallel to and in spatial relation to said apertures and positioned to receive a graphic symbol grouping on said scale member in register with said opening and visible through said opening to relate symbols in a said grouping with said control switches.

5. The control panel of claim 1 further comprising
   (e) an independent switch electrically connected in parallel to said control switches; and
   (f) a voltage dividing network having a potentiometer resistor having a movable tap, said potentiometer resistor being electrically connected in parallel to the combination of said first circuit means and said second circuit means, the said movable tap being electrically connected to said independent switch such that adjustment of the movable tap relative to the potentiometer resistor determines the characteristics of an electrical signal produced when said independent switch is actuated.

6. The control panel of claim 5 further comprising
   (g) a random switch electrically connected in parallel to the combination of said control switches, said first circuit means and said second circuit means for producing an electrical signal which is independent of said first circuit means, said second circuit means and said potentiometer resistor when said random switch is actuated.

7. The control panel of claim 1 wherein said first circuit means includes a plurality of said series connected resistors and said second circuit means includes selective switching means fixedly connected to move with said scale member and range changing resistance means connected in series circuit relationship with said first circuit means and operatively connected to said selective switching means to enable said scale member upon movement thereof to change the series circuit relationship of the first and second circuit means for varying the predetermined electrical signal produced from said first circuit means in response to actuation of any one of said switches.

8. The control panel of claim 7 further including
   (e) generating means operatively coupled to said first and second circuit means for maintaining a constant current through said circuit means.

9. A control panel for electrically operating a controlled device, said control panel comprising,
   (a) terminal means adapted for connection to a source of potential;
   (b) a circuit electrically connected to said terminal means and including
      (1) a constant resistance network including
         (i) a plurality of selection resistors each having end terminals and connected in series circuit relation with each other providing connecting terminals at the ends thereof,
         (ii) a plurality of range-adjusting resistors each having end terminals and being capable of being selectively switched in various series circuit connections with said selection resistors while maintaining the constant resistance of said constant resistance network,
         (iii) output terminal means adapted for connection to a controlled device, and
         (iv) a plurality of control switches each respectively connected between different end terminals of said plurality of selection resistors and said output terminals means for producing a predetermined electrical signal when any one of said control switches is actuated, and (2) a voltage dividing network electrically connected in parallel with said constant resistance network, said voltage dividing network including (i) at least one potentiometer having a movable tap, and (ii) an independent switch connected between said movable potentiometer tap and said output terminal means for producing an electrical signal determined by the position of said potentiometer tap when said independent switch is actuated;

(c) a movable scale member positioned adjacent said control switches and having a plurality of selectable graphic symbol groupings each grouping being capable of being positioned in adjacent alignment with said control switches, said graphic symbols within each grouping being assigned one to each control switch when a said grouping is selectively positioned in adjacent alignment with said control switches; and (d) a multicontact switch having a plurality of fixed contacts and a wiper member, said wiper member being fixedly connected to move with said scale member and being electrically connected to the said series connected selection resistors, said fixed contacts being electrically connected to different end terminals of said plurality of range-adjusting resistors, said wiper member engaging predetermined ones of said fixed contacts in response to said scale member being positioned to place a predetermined grouping in adjacent alignment with said control switches to selectively switch said plurality of range-adjusting resistors in various series circuit relationships with said series connected selection resistors whereby the predetermined electrical signals produced when any one of said control switches is actuated is representative of the graphic symbol assigned to that switch by said scale member.

10. The control panel of claim 9 further comprising (e) a random switch electrically connected between said source terminal means and said output terminal means for producing an electrical signal which is independent of said constant resistance network and said voltage dividing network.

11. The control panel of claim 10 further comprising (f) a cover, said cover having a plurality of apertures arranged in an array and an elongated opening extending parallel to and in spatial relation to said apertures, each of said apertures having one of said control switches positioned therein and said elongated opening having said movable scale member positioned therein such that when said scale member is positioned in said opening the grouping of said graphic symbols registered therein is visible through said opening.

12. The control panel of claim 10 further comprising (f) an insulating base having an electrical printed circuit thereon for electrically connecting said control switches to said constant resistance network, said independent switches to said voltage dividing network, said random switch in parallel with said constant resistance and voltage dividing networks, said base further supporting said control, independent and random switches through fasteners, said fasteners electrically connecting said control, independent and random switches into circuit connecting relationship with said electrical printed circuit.

13. The control panel of claim 12 further comprising (g) a scale support member rigidly connected to said insulating base for rotatably supporting said scale member, said scale support being coupled to and supporting said multicontact switch in spaced relationship from said scale member.

14. A control panel for operating an electrically controlled device comprising (a) an insulating base having an electrical printed circuit thereon;

(b) a plurality of momentary-contact switches pivotally mounted on said insulating base, said switches being electrically connected as part of said electrical printed circuit;

(c) a rotatable scale member having a plurality of groupings of graphic symbols thereon, each said grouping being capable of being selectively positioned in adjacent alignment with certain of said momentary-contact switches;

(d) a support member rigidly connected to said insulating base for rotatably supporting said rotatable scale member; and (e) a multicontact switch operatively coupled to said rotatable scale member and to said electrical printed circuit, said multicontact switch having at least one contact associated with each of said groupings which is engaged in response to the scale member being rotated to place each grouping of graphic symbols in its selected position.

References Cited

UNITED STATES PATENTS

| | | | |
|---|---|---|---|
| 2,873,428 | 2/1959 | Bruno et al. | 324—98 X |
| 2,901,685 | 8/1959 | Alder. | |
| 3,243,691 | 3/1966 | Gibson et al. | 323—80 |
| 3,356,944 | 12/1967 | Coon | 324—98 |

ROBERT K. SCHAEFER, *Primary Examiner.*

T. B. JOIKE, *Assistant Examiner.*

U.S. Cl. X.R.

317—99; 323—79